United States Patent [19]

Takahashi et al.

[11] Patent Number: 5,746,515
[45] Date of Patent: May 5, 1998

[54] DYNAMIC-PRESSURE GAS BEARING

[75] Inventors: Akiyoshi Takahashi; Nakazo Ariyama; Isao Ohkawa; Hiroki Matsushita; Kachu Ishizuka, all of Iruma, Japan

[73] Assignee: Copal Electronics Co., Ltd., Tokyo, Japan

[21] Appl. No.: 791,945

[22] Filed: Jan. 31, 1997

[30] Foreign Application Priority Data

Feb. 2, 1996 [JP] Japan .................................. 8-052203

[51] Int. Cl.$^6$ ........................................... F16C 32/06
[52] U.S. Cl. ................................. 384/115; 384/120
[58] Field of Search ............................ 384/100, 114, 384/115, 120

[56] References Cited

U.S. PATENT DOCUMENTS

| | | | |
|---|---|---|---|
| 4,808,070 | 2/1989 | Fonda-Bonardi | 384/115 X |
| 5,240,332 | 8/1993 | Onishi et al. | 384/115 X |
| 5,415,476 | 5/1995 | Onishi | 384/115 X |

FOREIGN PATENT DOCUMENTS

| | | | |
|---|---|---|---|
| 215128 | 8/1993 | Japan | 384/115 |
| 28323 | 12/1994 | WIPO | 384/114 |

Primary Examiner—Thomas R. Hannon
Attorney, Agent, or Firm—Wenderoth, Lind & Ponack

[57] ABSTRACT

A dynamic-pressure gas bearing wherein a rotational shaft is disposed to surround an outer circumference of a stationary shaft or to be surrounded by an inner circumference of a stationary shaft, and a dynamic pressure is generated between the stationary shaft and the rotational shaft through rotation of the rotational shaft, characterized in that a water relief portion is provided. In a dynamic-pressure gas-bearing having a water relief portion, even when the bearing is used in a high-humidity environment or even when water (water vapor) contained in a gas liquefies due to high pressure, a pressure change, or the like, the water relief portion prevents a water film from being formed to thereby prevent an increase in a shear force acting between the stationary shaft and the rotational shaft.

18 Claims, 15 Drawing Sheets

DYNAMIC-PRESSURE GAS BEARING

BACKGROUND OF THE INVENTION

1. Field of the Invention

The present invention relates to a dynamic-pressure gas bearing, and particularly to a dynamic-pressure gas bearing for use with apparatuses which require high precision and high rotational speed, such as hard disk drives and optical scanners.

2. Description of the Related Art

Conventionally, a herringbone-type dynamic-pressure gas bearing having herringbone grooves as shown in FIGS. 28 and 29 has generally been used in a rotational bearing section of an apparatus which is required to have high precision and high rotational speed, such as a hard disk drive (HDD) or an optical scanner. There also have been used a wedge-type dynamic-pressure gas bearing (FIGS. 26 and 27) and a multiarc-type dynamic-pressure gas bearing (FIG. 23) by which characteristics similar to those of the herringbone-type dynamic-pressure gas bearing can be obtained without forming the herringbone grooves.

With reference to FIGS. 22 to 25, a detailed description will be given of an optical scanner 81 which employs the multiarc-type dynamic-pressure gas bearing 51 shown in FIG. 23, which is an example of a conventional dynamic-pressure bearing.

In the multiarc-type dynamic-pressure gas bearing 51, a sleeve 57$f$, whose inner circumferential surface has a circular sectional shape and which serves as a rotational shaft, is disposed such that it surrounds a stationary shaft 59$h$, whose outer circumferential surface has a sectional shape having multiple arcs (multiarc shape) and which is fixed onto a case 83. When a motor section, which will be described later, is driven, the sleeve 57$f$ serving as a rotational shaft rotates about the stationary shaft 59$h$, thereby generating a dynamic pressure in the radial direction. As compared with herringbone-type dynamic-pressure bearings 55$a$ and 55$b$ shown in FIGS. 28 and 29, respectively, the multiarc-type dynamic-pressure gas bearing 51 is characterized in that machining is easy because there is no requirement to form herringbone grooves (77$c$, etc.), that it can be rotated either clockwise or counterclockwise, and that dust or the like is not taken therein because there is no generation of axial gas flow.

A magnet 85 is fixed on the outer circumferential surface of the sleeve 57$f$ serving as a rotational shaft. A yoke 87 on which a coil 88 is wound is disposed in the case 83 at a position opposed to the magnet 85. The yoke 87 and the magnet 85 compose a motor section. A rotary polygon mirror 86 and a thrust bearing 84 are disposed at the upper and lower portions, respectively, of the sleeve 57$f$.

A cover 82 is provided on the upper portion of the case 83 such that the case 83 and the cover 82 seal the interior. (In some cases, this seal is not used.)

The multiarc-type dynamic-pressure gas bearing 51 will next be described in detail. FIG. 23 is a transverse cross-section of an assembly of the stationary shaft 59$h$ and the sleeve 57$f$, showing a 3-arc-type dynamic-pressure gas bearing having three sinusoidal arcs. FIG. 24 is a circumferentially developed view of the stationary shaft 59$h$ and the sleeve 57$f$, illustrating the spacing between the stationary shaft 59$h$ and the sleeve 57$f$. There are provided a predetermined clearance Cr between the stationary shaft 59$h$ and the sleeve 57$f$, and a gap $\alpha$ formed by a sinusoidal arc. As the sleeve 57$f$ rotates about the stationary shaft 59$h$, the gap $\alpha$ generates a dynamic pressure as shown in FIG. 25, so that the sleeve 57$f$ functions as a dynamic-pressure gas bearing.

Unlike the herringbone-type dynamic-pressure gas bearings 55$a$ and 55$b$, the multiarc-type dynamic-pressure gas bearing 51 does not generate axial gas flow, and thus does not take in dust or the like. Accordingly, the multiarc-type dynamic-pressure gas bearing 51 is suited for use in a hard disk drive (HDD) and an optical scanner, which are required to have a certain degree of cleanliness.

Also, like the multiarc-type dynamic-pressure gas bearing 51, wedge-type dynamic-pressure gas bearings 53$a$ and 53$b$ shown in FIGS. 26 and 27 do not induce axial gas flow.

In the optical scanner 81 having the thus-structured multiarc-type dynamic-pressure gas bearing 51, through excitation of the coil 88 of the motor section, the sleeve 57$f$ serving as a rotational shaft is rotated to thereby generate a dynamic pressure between the outer circumferential surface of the stationary shaft 59$h$ and the inner circumferential surface of the sleeve 57$f$ as well as to rotate the rotary polygon mirror 86 mounted on the sleeve 57$f$.

However, the above-described multiarc-type dynamic-pressure gas bearing 51 has been found to have the following problems.

When the multiarc-type dynamic-pressure gas bearing 51 is used in a high-humidity environment, water is generated between the stationary shaft 59$h$ and the sleeve 57$f$ serving as a rotational shaft. Thus, a water film is formed within the multiarc-type dynamic-pressure gas bearing 51. Since the coefficient of viscosity of water is about 100 times that of air, when air is used as a gas, friction, i.e. a shear force $\tau$, induced by water between the stationary shaft 59$h$ and the sleeve 57$f$ is also about 100 times that induced by air. Thus, a very large loss will be caused in such bearings.

This shear force $\tau$ causes wear or damage on a bearing surface, i.e. the outer circumferential surface of the stationary shaft 59$h$ or the inner circumferential surface of the sleeve 57$f$, resulting in a reduced service life of the dynamic-pressure gas bearing and in some cases, a seizure due to advanced wear or damage. FIG. 21 shows the surface of a bearing suffering from such an impairment.

In the multiarc-type gas bearing 51, water is conceivably generated according to the following two mechanisms. In one case, as a gas is subjected to pressure changes (accompanied by temperature changes) along the same circumference (see FIG. 25), water (water vapor) contained in the gas condenses. In the other case, due to a gas being pressurized, water (water vapor) contained in the gas is saturated to liquefy.

In the multiarc-type dynamic-pressure gas bearing 51, due to the absence of axial gas flow, such water generation is observed. In addition, it is also experimentally confirmed that a similar water generation occurs even in herringbone-type dynamic-pressure gas bearings (see FIGS. 28 and 29) and wedge-type dynamic-pressure bearings (see FIGS. 26 and 27).

In most herringbone-type dynamic-pressure gas bearings, axial gas flow occurs due to their structure. This axial gas flow suppresses the formation of a water film. As a result, the phenomenon of such water generation has merely been unnoticed up until now.

In an extremely high-humidity environment, due to a pumping action of herringbone grooves, a water film is formed in that region of a bearing section where pressure becomes high (hereinafter, referred to as a high-pressure region) (see pressure distribution diagrams of FIGS. 28 and 29), causing rotation performance to deteriorate. This phenomenon has been experimentally confirmed (see FIG. 19). As described above, in a dynamic-pressure gas bearing, there has been a problem that water (water vapor) contained in a gas liquefies to form a water film between a stationary shaft and a rotational shaft, which increases a shear force and results in degraded performance and shortened service life of the dynamic-pressure gas bearing and in a worse case, seizure.

SUMMARY OF THE INVENTION

It is an object of the present invention to solve the above-mentioned problems in a conventional dynamic-pressure gas bearing, and to provide a dynamic-pressure gas bearing capable of preventing a water film from being formed even in a high-humidity environment, to thereby provide expected bearing performance, long service life, and high reliability.

To achieve the above object, the present invention provides a dynamic-pressure gas bearing wherein a rotational shaft is disposed to surround the outer circumference of a stationary shaft or to be surrounded by the inner circumference of the stationary shaft, and a dynamic pressure is generated between the stationary shaft and the rotational shaft through rotation of the rotational shaft, and wherein a water relief portion is provided.

Also, the dynamic-pressure gas bearing has a structure in which the water relief portion is provided on the rotational shaft or the stationary shaft, which is disposed to surround the outer circumference of the stationary shaft or the rotational shaft, in a region where the surface of the stationary shaft and the surface of the rotational shaft are close to each other.

Further, the dynamic-pressure gas bearing has a structure in which the water relief portion is provided on the stationary shaft or the rotational shaft in a circumferential pressure-varying region.

Additionally, the dynamic-pressure gas bearing has a structure in which the water relief portion is provided on the stationary shaft or the rotational shaft at an ungrooved high-pressure region.

In a dynamic-pressure gas bearing having a water relief portion as described above, even when the bearing is used in a high-humidity environment or even when water (water vapor) contained in a gas liquefies due to high pressure, a pressure change, or the like, the water relief portion prevents a water film from being formed to thereby prevent an increase in a shear force acting between the stationary shaft and the rotational shaft.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Embodiments of the present invention will next be described in detail with reference to the accompanying drawings. Redundant descriptions of the embodiments will be omitted.

First Embodiment

Figure 1:
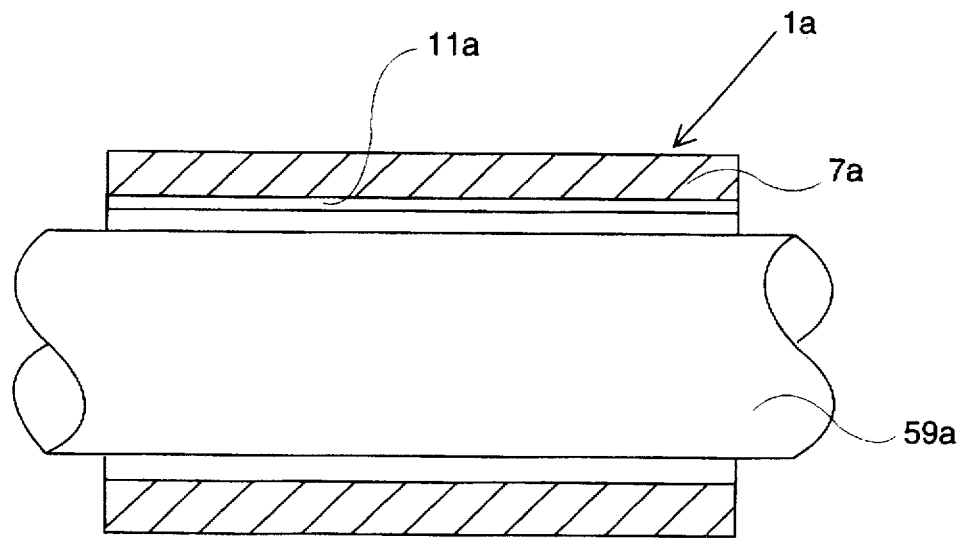
FIG. 1 shows an axial sectional view of a dynamic-pressure gas bearing according to a first embodiment of the present invention.
Figure 2:
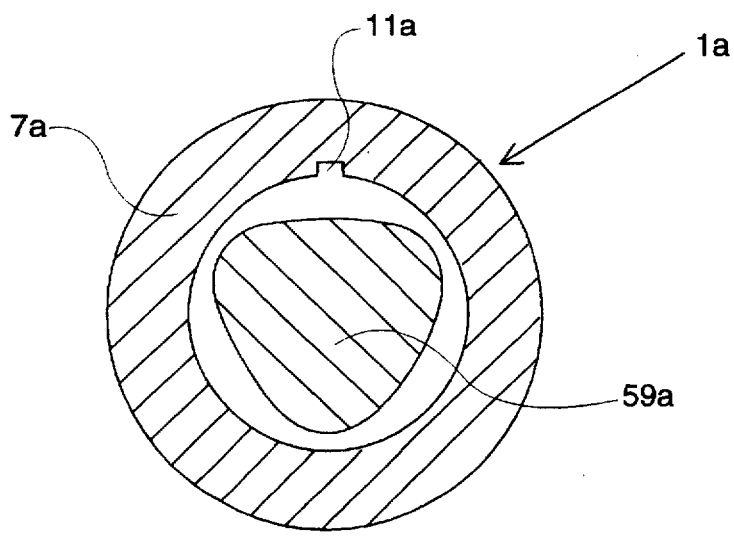
FIG. 2 shows a radial sectional view of a dynamic-pressure gas bearing according to the first embodiment of the present invention.
Figure 24:
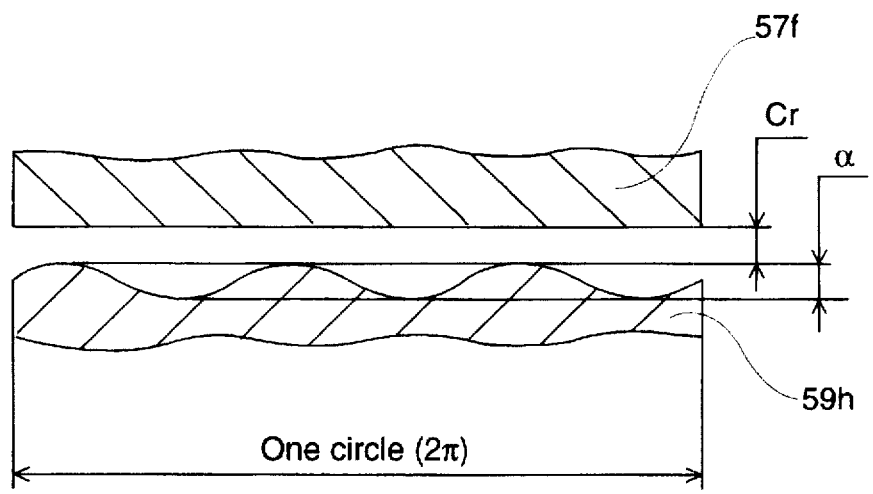
FIG. 24 is a circumferential development view of a conventional multiarc-type dynamic-pressure gas bearing.
Figure 25:
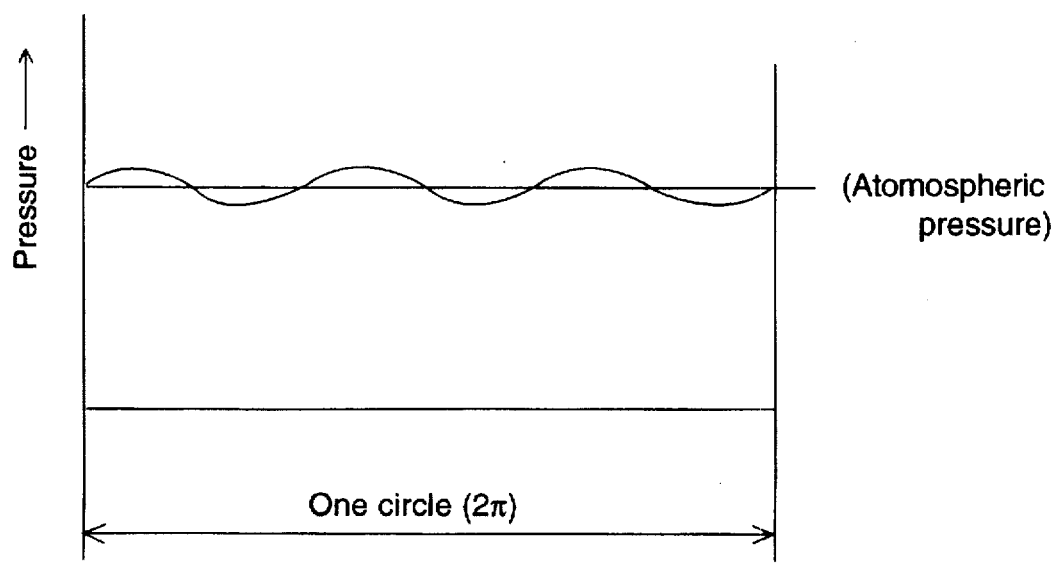
FIG. 25 is a circumferential pressure distribution diagram of a conventional multiarc-type dynamic-pressure gas bearing.
Figure 26:
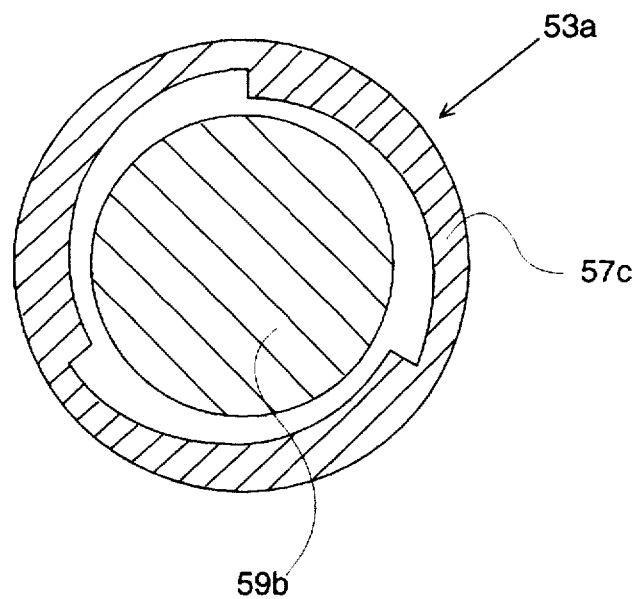
FIG. 26 is a radial sectional view of a first conventional wedge-type dynamic-pressure gas bearing.
Figure 27:
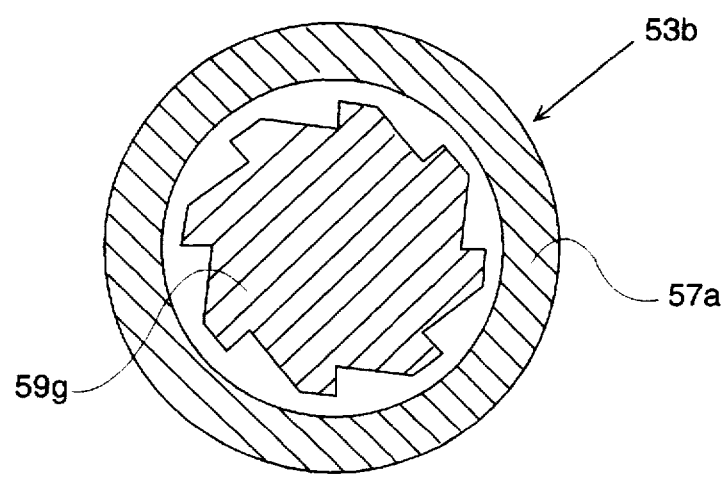
FIG. 27 is a radial sectional view of a second conventional wedge-type dynamic-pressure gas bearing.

In a first embodiment of the present invention shown in FIGS. 1 and 2, a multiarc-type stationary shaft 59a has an outer circumference formed to have a multiarc sectional shape comprising a plurality of arcs. FIG. 2 shows a stationary shaft whose outer circumference has a three-arc sectional shape comprising three arcs. A rotational shaft 7a has an inner circumference formed to have a circular sectional shape and is disposed to surround the stationary shaft 59a in a manner maintaining a predetermined clearance therebetween (see FIG. 24) as in the case of the conventional multiarc-type dynamic-pressure gas bearing 51. Further, a water relief portion 11a comprising a linear groove is formed in an axial direction. A dynamic-pressure gas bearing 1a is thus structured.

The operation of the thus-structured dynamic-pressure gas bearing 1a will be described in detail with reference to FIG. 7. FIGS. 7A, 7B, 7C and 7D show the state of the interior of the conventional three-arc-type dynamic-pressure gas bearing 51 over a period of time beginning immediately after start-up, FIGS. 7E, 7F, 7G and 7H correspond to sections 7A to 7D, illustrating the state of the interior of the dynamic-pressure gas bearing 1a of the present invention.

Figure 7A:
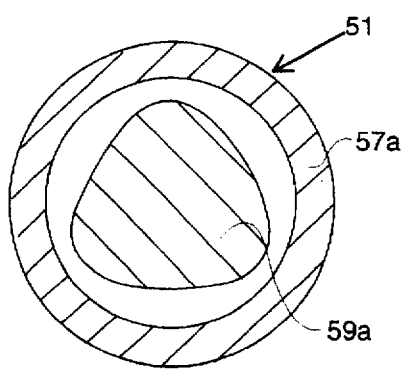
FIGS. 7A to 7H are views for illustrating the generation of a water film in a multiarc-type dynamic-pressure gas bearing.
Figure 7E:
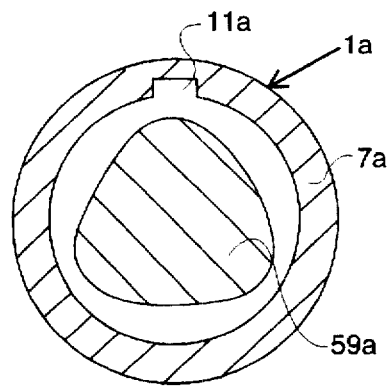

In the states of FIGS. 7A and 7E immediately after start-up, water (water vapor) contained in a gas is not liquefied in either bearing.

Figure 7B:
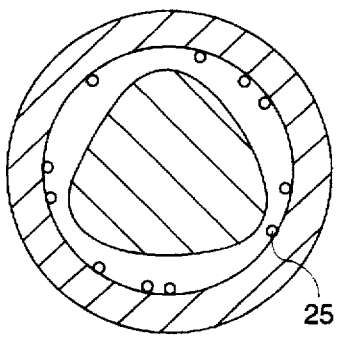
Figure 7F:
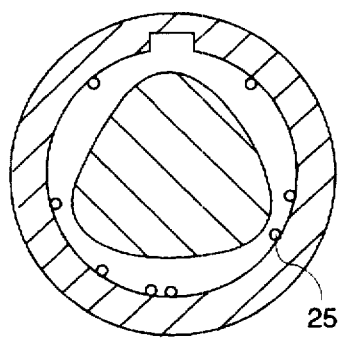

Subsequently, in FIGS. 7B and 7F, water particles 25 generated through a pressure change within the bearings begin to gradually adhere to the bearing inner circumferential surface due to a centrifugal force induced by bearing rotation.

Figure 7C:
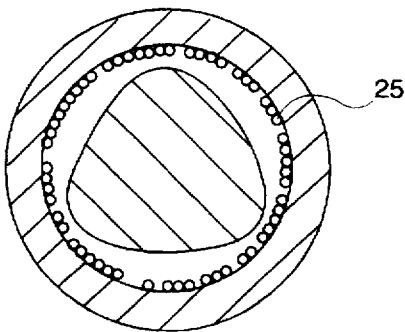
Figure 7G:
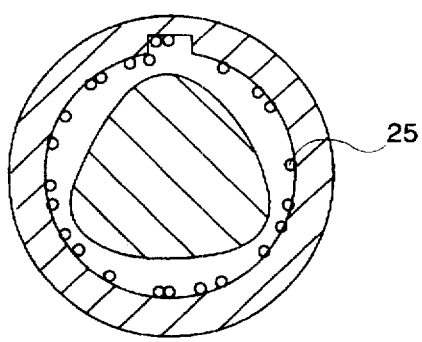

As time elapses somewhat, as shown in FIGS. 7C and 7G, the number of water particles 25 adhering the bearing inner circumferential surface increases. At this time, some water particles 25 are observed to adhere to the water relief portion 11a formed in the dynamic-pressure gas bearing 1a of the present invention.

Figure 7D:
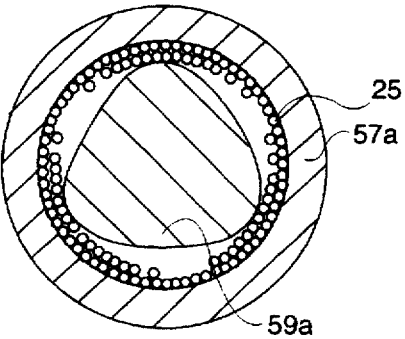

As time elapses more, in the conventional dynamic-pressure gas bearing 51, as shown in FIG. 7D, the gap between the stationary shaft 59a and a rotational shaft 57a becomes full of the water particles 25, resulting in a failure to maintain a clearance Cr. That is, a water film is formed. Once this state is established, as described previously, the bearing performance is degraded because of an increase in rotational load stemming from a shear force of water which is about 100 times that of a gas (air).

Figure 7H:
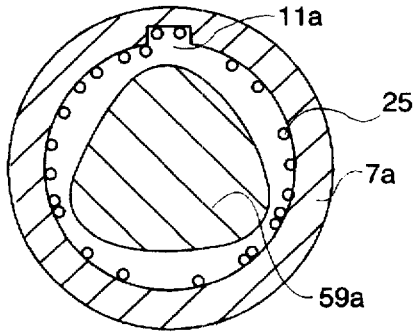

On the other hand, in the dynamic-pressure gas bearing 1a of the present invention, as shown in FIG. 7H, water particles 25 adhering to the water relief portion 11a are subjected to depressurization induced by the water relief portion 11a and thus vaporize to disappear. The state of FIG. 7H shows almost no change from the state of FIG. 7G. Thus, the gap between the stationary shaft 59a and the rotational shaft 7a is not filled with the water particles 25. That is, since no water film is formed, a required bearing performance is not impaired, and the service life of a dynamic-pressure gas bearing is not shortened.

Second Embodiment

Figure 3:
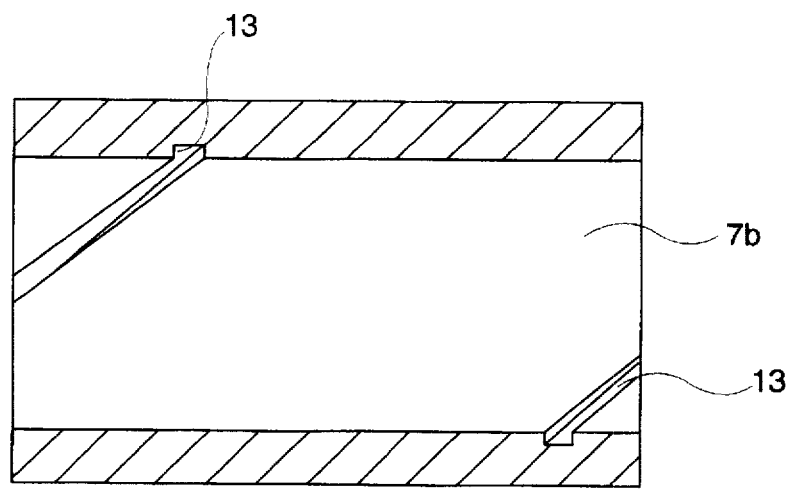
FIG. 3 shows an axial sectional view of a rotational shaft of a second embodiment of the present invention.
Figure 4:
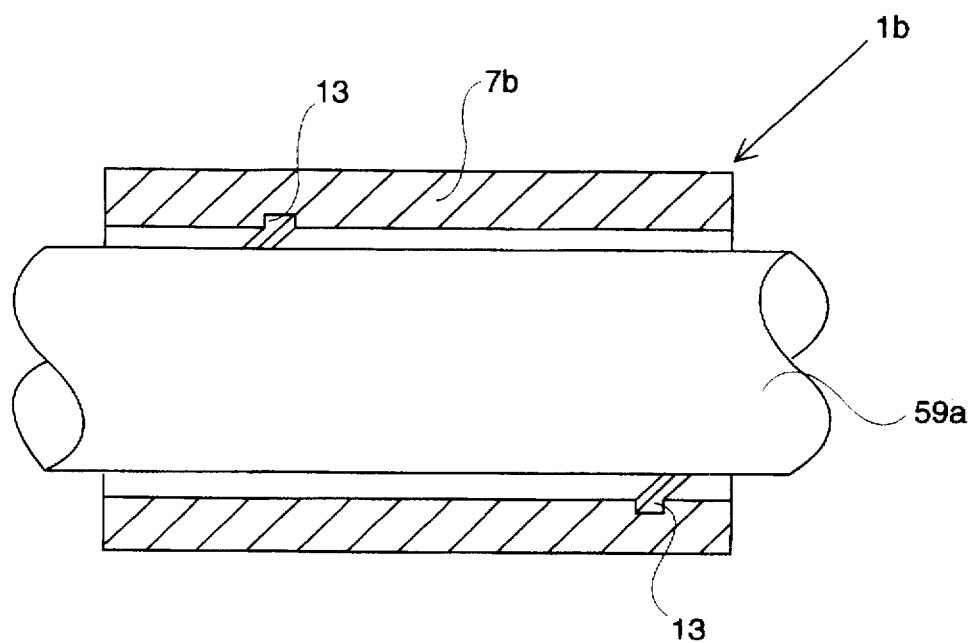
FIG. 4 shows an axial sectional view of a dynamic-pressure gas bearing according to the second embodiment of the present invention.

A second embodiment of the present invention shown in FIGS. 3 and 4 is different from the first embodiment of the present invention primarily in that a water relief portion 13 is a spiral groove. A dynamic-pressure gas bearing 1b having such a structure also provides an effect similar to that of the first embodiment of the present invention.

Further, as a result of the water relief portion 13 being a spiral groove, axial gas flow is generated within a bearing. Even when the water relief portion 13 is not formed over the entire axial bearing length, i.e. even when the water relief portion 13 is partially formed in the axial direction as shown in FIG. 3, an equivalent effect can be obtained.

Figure 28:
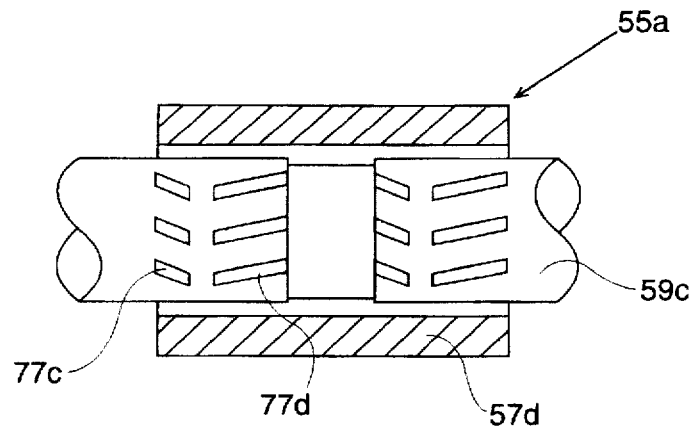
FIG. 28 is a radial sectional view and pressure distribution diagram of a first conventional herringbone-type dynamic-pressure gas bearing.
Figure 28:
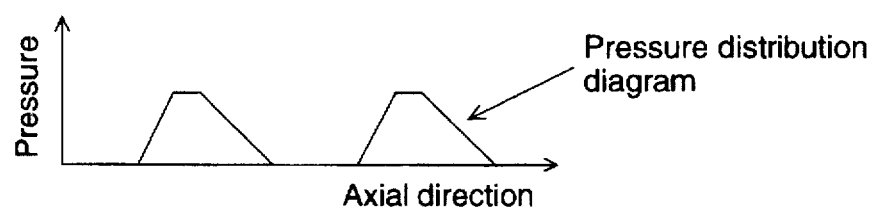
Figure 29:
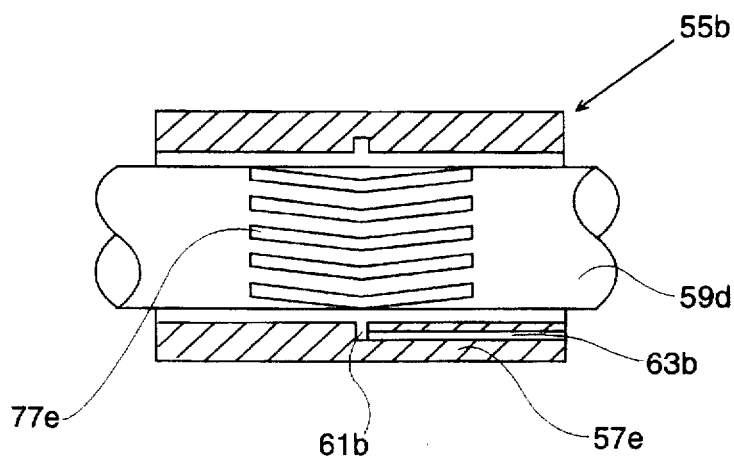
FIG. 29 is a radial sectional view and pressure distribution diagram of a second conventional herringbone-type dynamic-pressure gas bearing.
Figure 29:
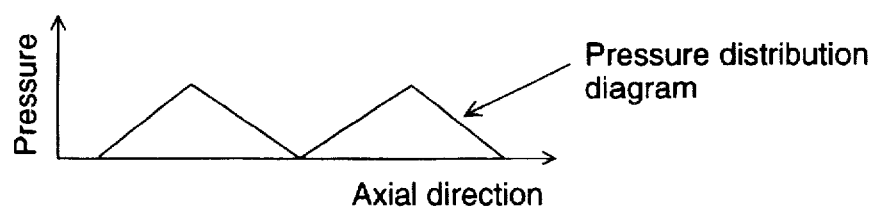

Since axial gas flow is less as compared with a conventional herringbone-type dynamic-pressure gas bearing (see FIGS. 28 and 29), there hardly arises a problem that dust or the like is taken into the interior of the bearing.

Third Embodiment

Figure 5:
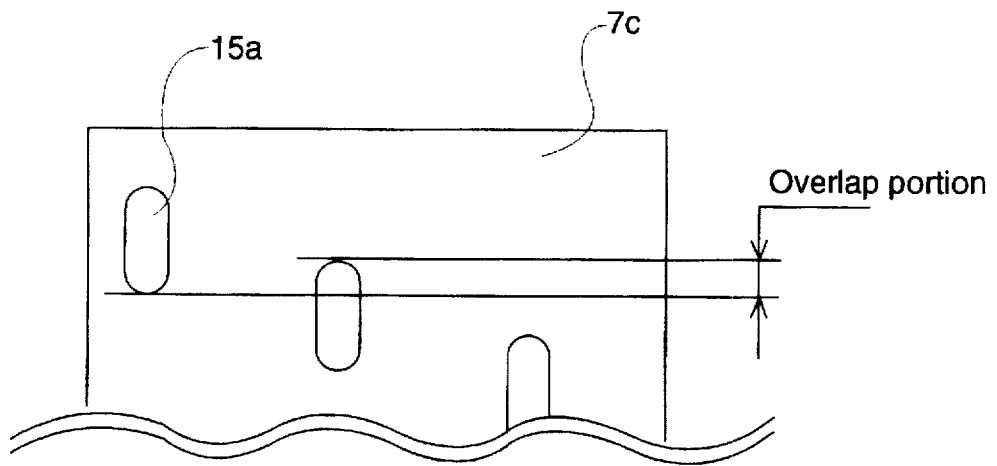
FIG. 5 shows a circumferential development view of a rotational shaft of a third embodiment of the present invention.

A third embodiment of the present invention shown in FIG. 5 is different from the first embodiment of the present invention primarily in that a water relief portion 15a is composed of a plurality of depressions, not a continuous groove.

The water relief portion 15a is composed of a plurality of depressions such that a portion of a certain depression overlaps with a portion of another depression as viewed in a circumferential direction (such a portion is called an overlap portion), as shown in FIG. 5. Accordingly, an effect similar to that of the first embodiment of the present invention can be obtained for any portion of a bearing in the axial direction.

Fourth Embodiment

Figure 6:
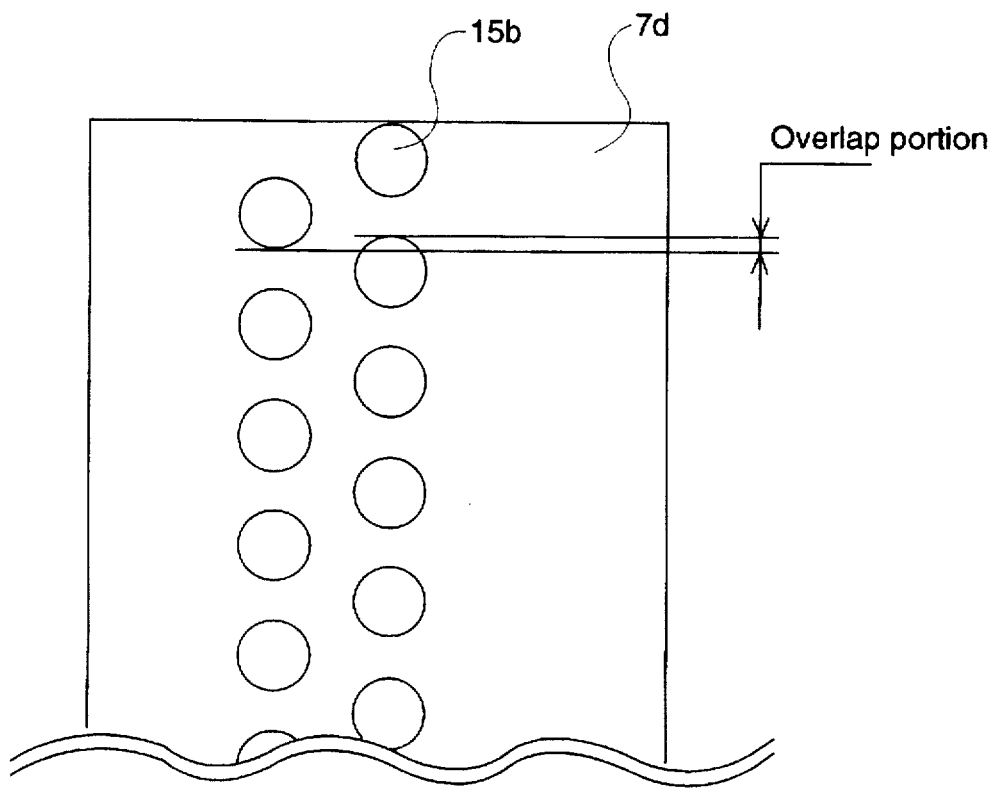
FIG. 6 shows a circumferential development view of a rotational shaft of a fourth embodiment of the present invention.

A fourth embodiment of the present invention shown in FIG. 6 is different from the third embodiment of the present invention primarily in that a plurality of depressions which compose a water relief portion 15b are individually formed into a circular shape, not an elongated circle.

These circular depressions are arranged so as to have an overlap portion to thereby obtain an effect similar to that of the third embodiment of the present invention.

Specific shapes are not illustrated herein, but the shape of those depressions which compose a water relief portion is not limited to an elongated circle and a circle. Also, these shapes may be used in combination, and depressions are not necessarily arranged in a regular manner.

An arrangement without overlap portions may be employed depending on a required performance such as the usability in a high-humidity environment in which a bearing is to be used. When no overlap portions are employed, a water film may be formed in a nonoverlapping portion, but an adverse effect may not be given to bearing performance in a certain environment of use.

Figure 8:
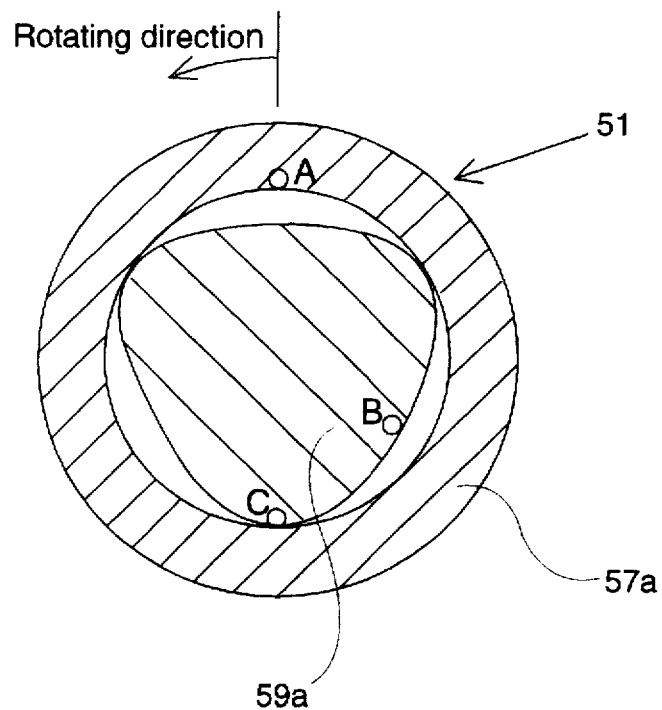
FIG. 8 is a radial sectional view showing a pressure distribution in regions of a multiarc-type dynamic-pressure gas bearing.
Figure 9:
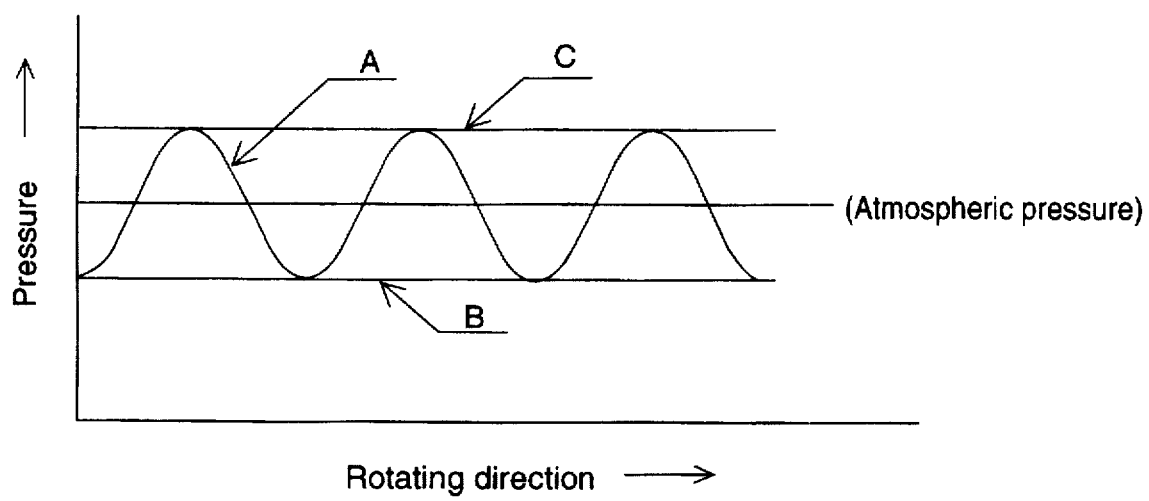
FIG. 9 is a pressure distribution diagram for the regions of the multiarc-type dynamic-pressure gas bearing of FIG. 8.

Pressure distribution at regions (A, B, and C) of the multiarc-type dynamic-pressure gas bearing 51 shown in FIG. 8 will next be described with reference to FIG. 9. As the rotational shaft 57a rotates, pressure at region A on the inner circumferential surface of the rotary shaft 57a sinusoidally varies as represented by curve A in FIG. 9. This region where pressure varies is called a circumferential pressure-varying region.

On the outer circumferential surface of the stationary shaft 59a, a region where the gap between the stationary shaft 59a and the rotational shaft 51a becomes maximum is taken as region B, and a region where the gap becomes minimum is taken as region C. This region C is called a stationary shaft-rotational shaft proximity region. In this case, as represented by lines B and C of FIG. 9, their pressures are constant even when the rotational shaft 57a rotates. In the multiarc-type dynamic-pressure gas bearing 51, these regions are characterized by such pressure distributions.

Figure 10:
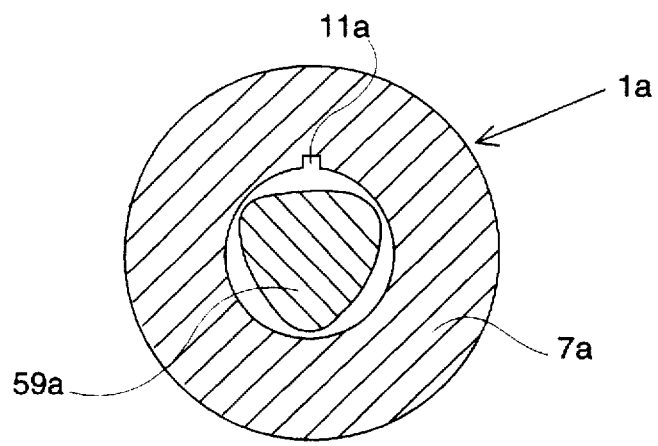
FIG. 10 is a first radial sectional view showing a position where a water relief portion of the present invention is provided.
Figure 11:
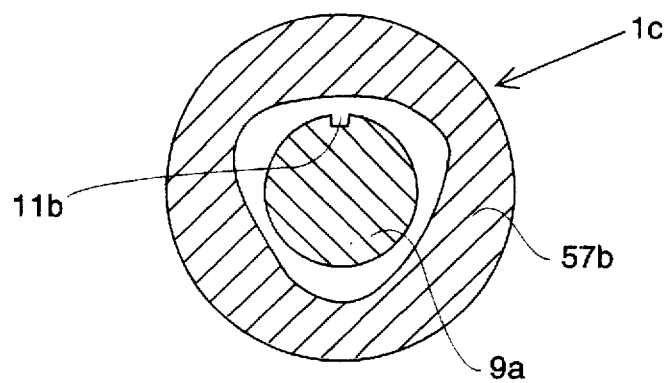
FIG. 11 is a second radial sectional view showing a position where a water relief portion of the present invention is provided.
Figure 12:
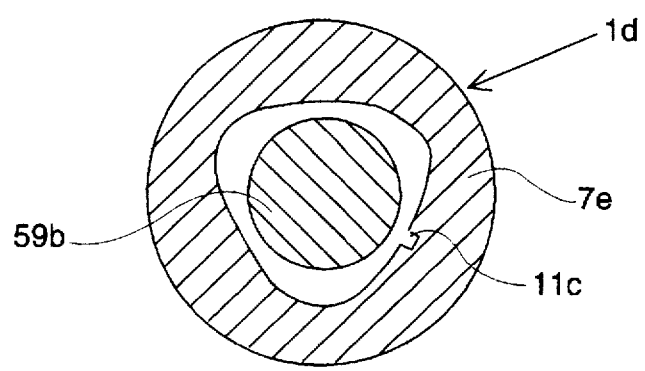
FIG. 12 is a third radial sectional view showing a position where a water relief portion of the present invention is provided.

FIGS. 10 to 12 show locations where the water relief portion 11a, 13, 15a, or 15b are provided. In FIG. 10, a water relief portion is provided in the circumferential pressure-varying region of a rotational shaft 7a. In FIG. 11, a water relief portion is provided in the circumferential pressure-varying region of a stationary shaft 9a. In FIG. 12, a water relief portion is provided on a rotational shaft 7e in the stationary shaft-rotational shaft proximity region. In this case, preferably, the water relief portion is provided in a region where the stationary shaft surface and the rotational shaft surface are in relatively closest proximity.

Here, for convenience of description, it is assumed that an outer shaft serves as a stationary shaft, and an inner shaft serves as a rotational shaft. However, the stationary shaft and the rotational shaft may be disposed in reverse.

Other Embodiments

Figure 13:
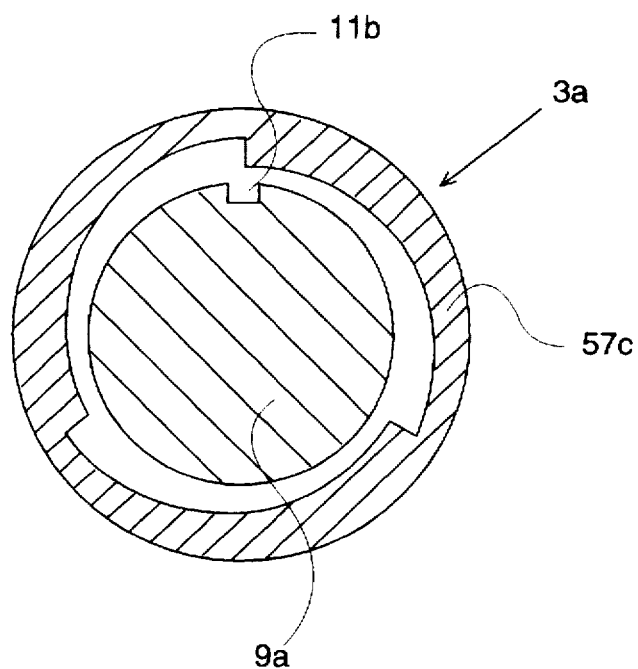
FIG. 13 is a radial sectional view of a dynamic-pressure gas bearing according to a fifth embodiment of the present invention.
Figure 14:
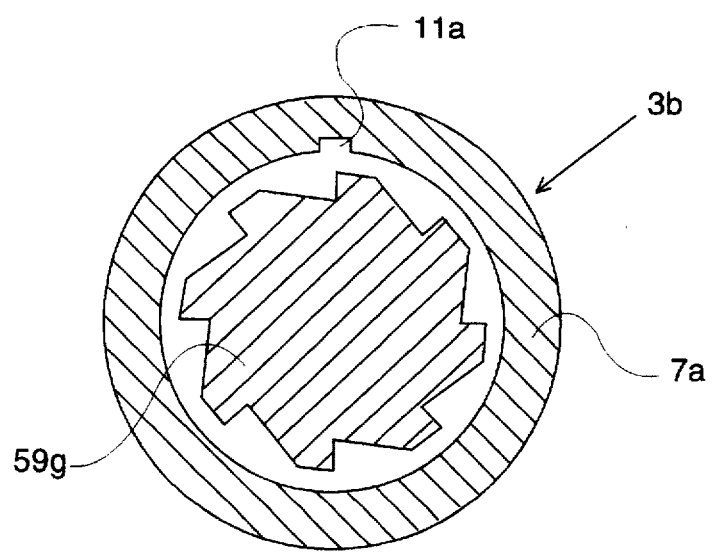
FIG. 14 is a radial sectional view of a dynamic-pressure gas bearing according to a sixth embodiment of the present invention.

Fifth and sixth embodiments of the present invention shown in FIGS. 13 and 14 are different from the first embodiment of the present invention primarily in that water relief portions 11b and 11a are formed in wedge-type dynamic-pressure gas bearings 3a and 3b, respectively, not in a multiarc-type dynamic-pressure gas bearing.

Even in this structure, an effect similar to that of the first embodiment of the present invention can be obtained.

Figure 15:
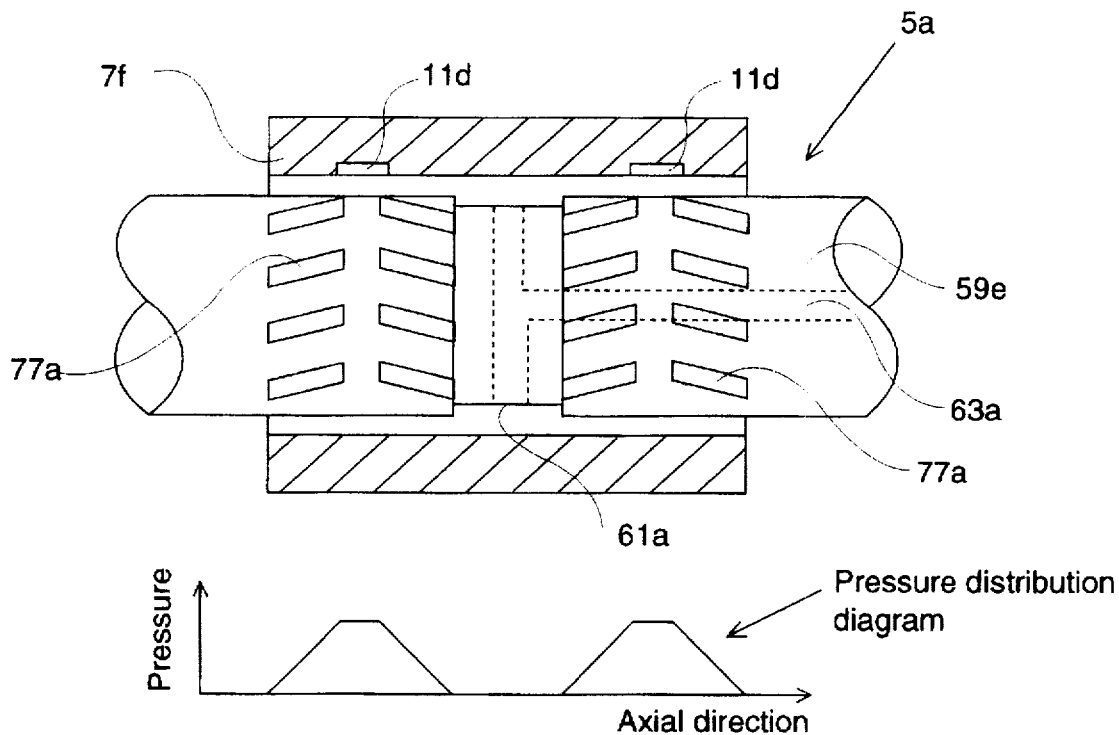
FIG. 15 is a radial sectional view and pressure distribution diagram of a dynamic-pressure gas bearing according to a seventh embodiment of the present invention.
Figure 16:
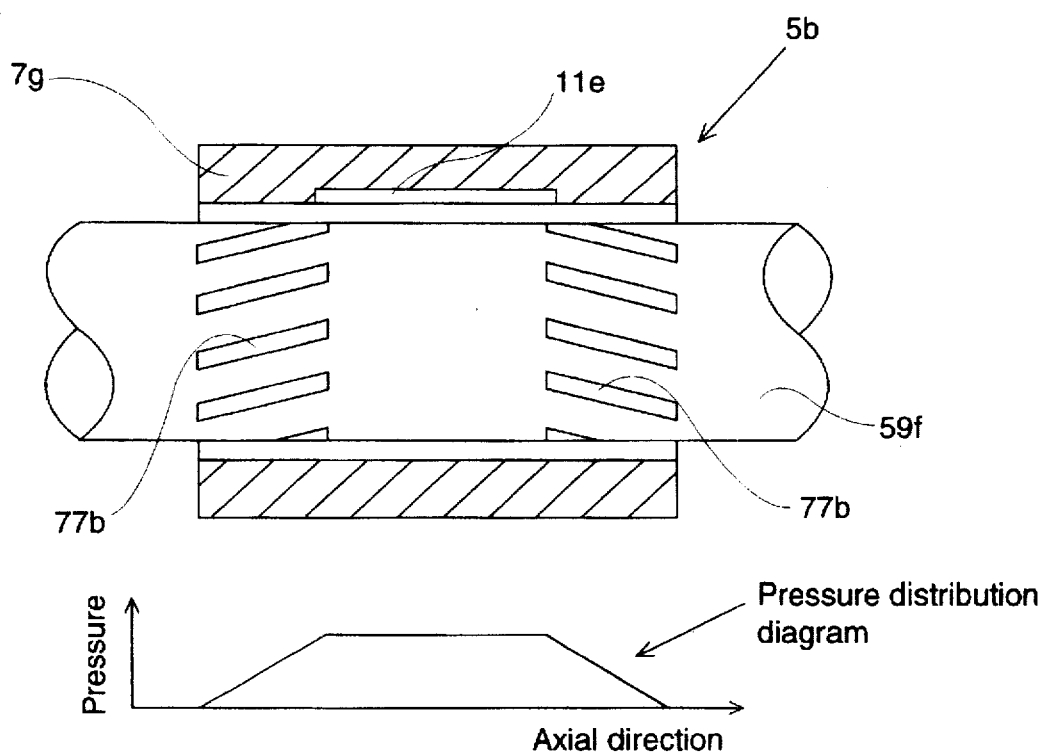
FIG. 16 is a radial sectional view and pressure distribution diagram of a dynamic-pressure gas bearing according to an eighth embodiment of the present invention.
Figure 17:
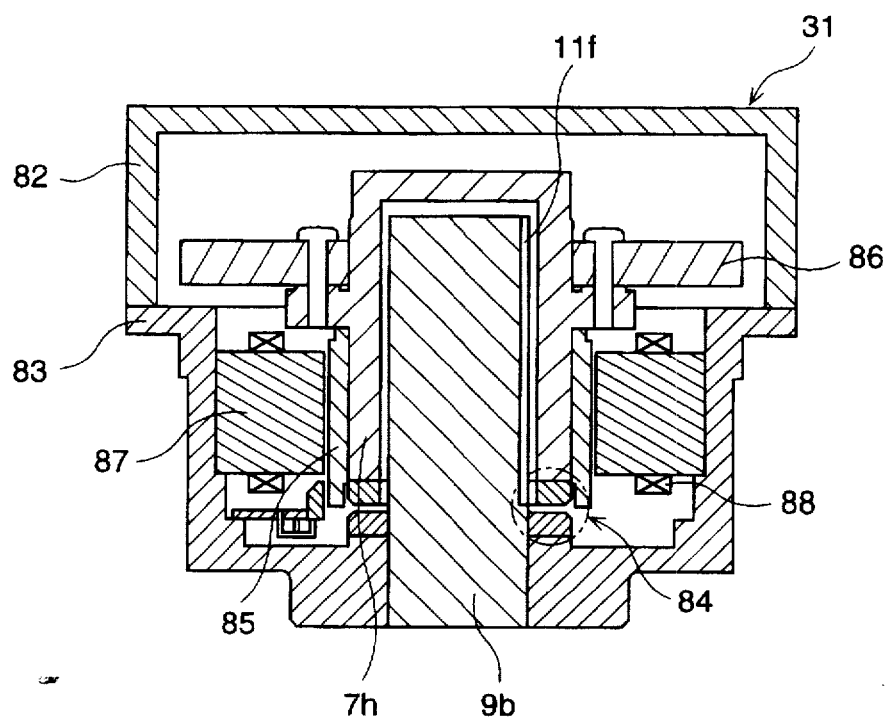
FIG. 17 is a vertical sectional view of an optical scanner which employs a dynamic-pressure gas bearing of the present invention.
Figure 18:
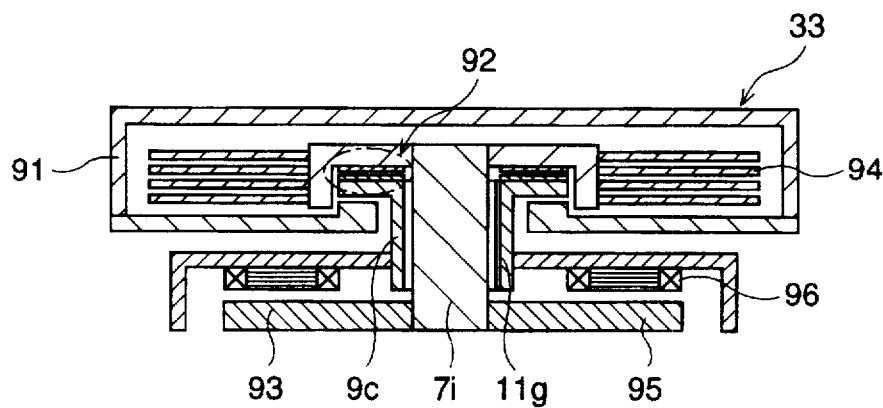
FIG. 18 is a vertical sectional view of a hard disk drive (HDD) which employs a dynamic-pressure gas bearing of the present invention.
Figure 19:
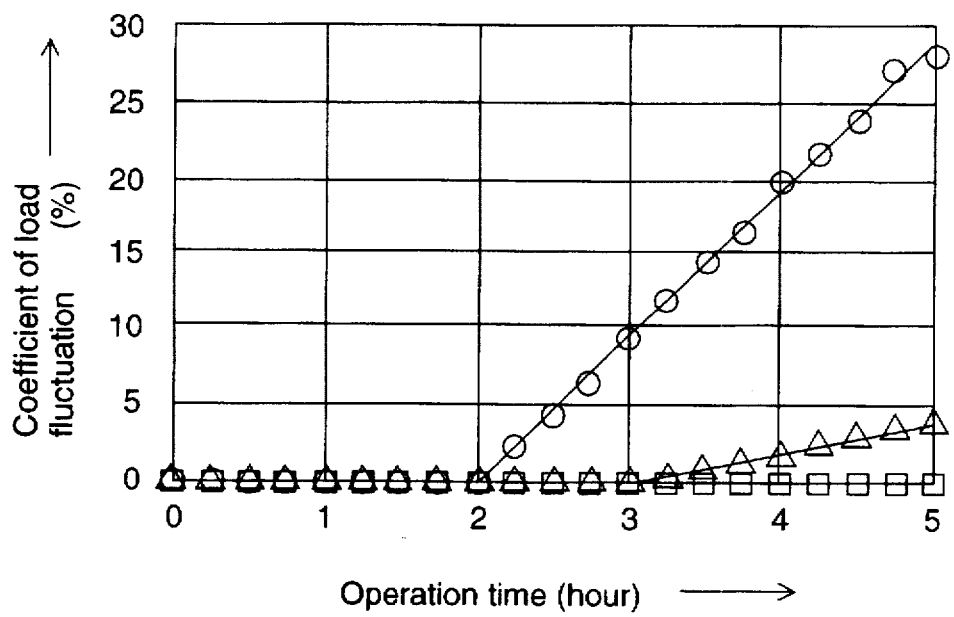
FIG. 19 is a graph showing a coefficient of load torque fluctuation of a dynamic-pressure gas bearing.
Figure 20:
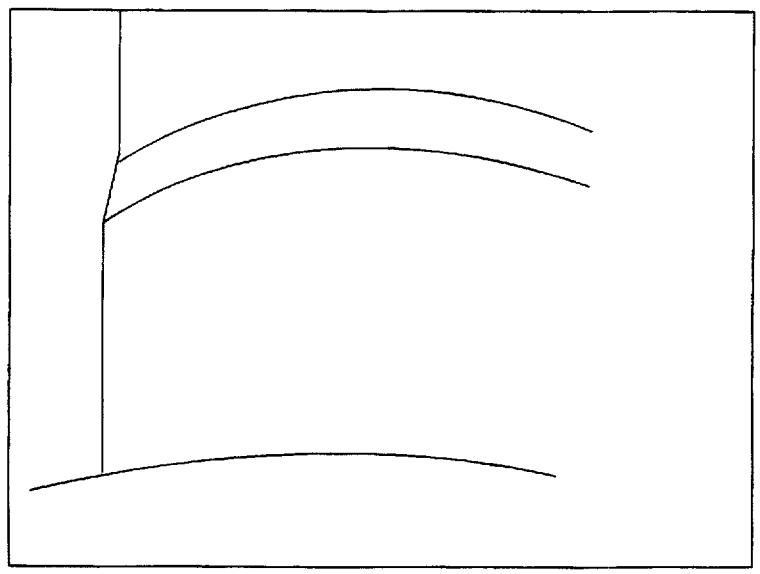
FIG. 20 is a view showing a state of a multiarc-type dynamic-pressure gas bearing before impairment.
Figure 21:
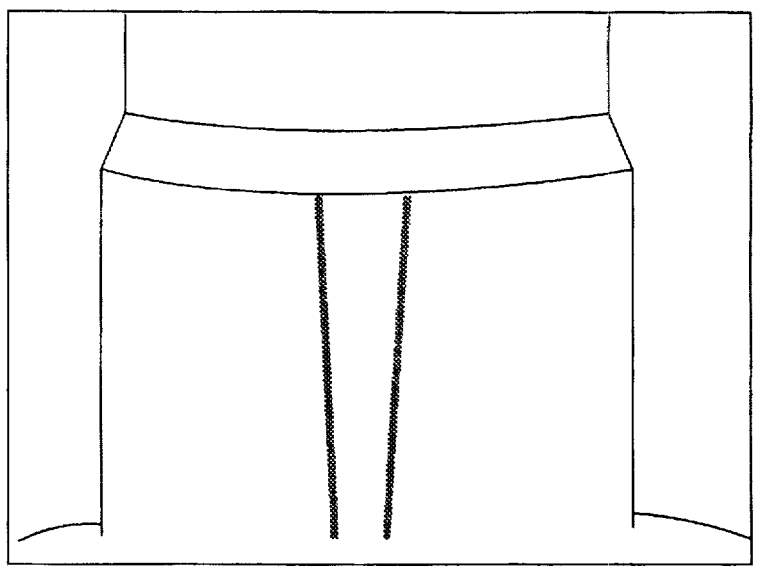
FIG. 21 is a view showing a state of a multiarc-type dynamic-pressure gas bearing after impairment.
Figure 22:
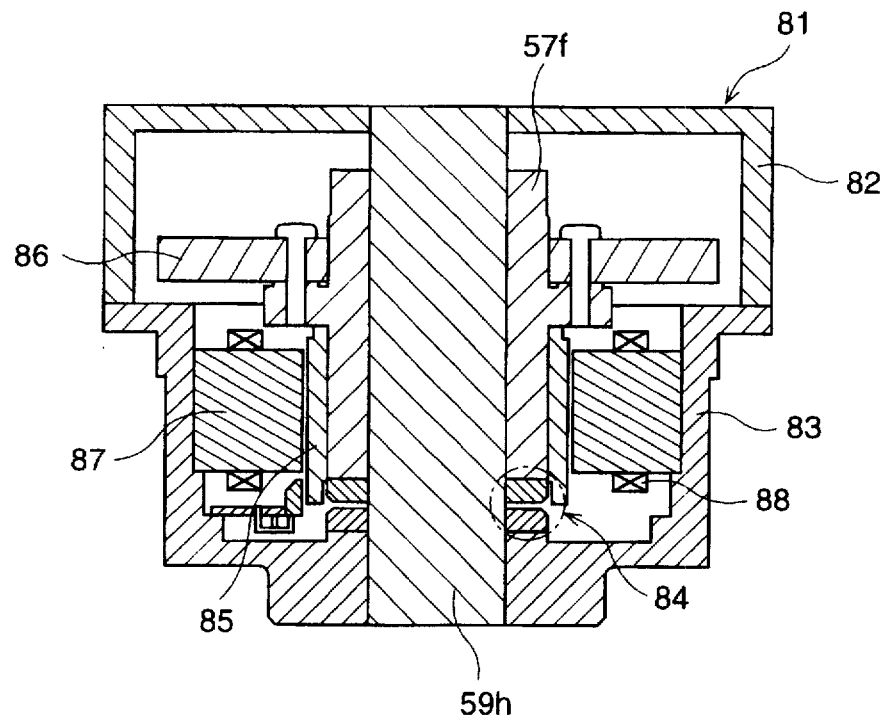
FIG. 22 is a vertical sectional view of an optical scanner which employs a conventional multiarc-type dynamic-pressure gas bearing.
Figure 23:
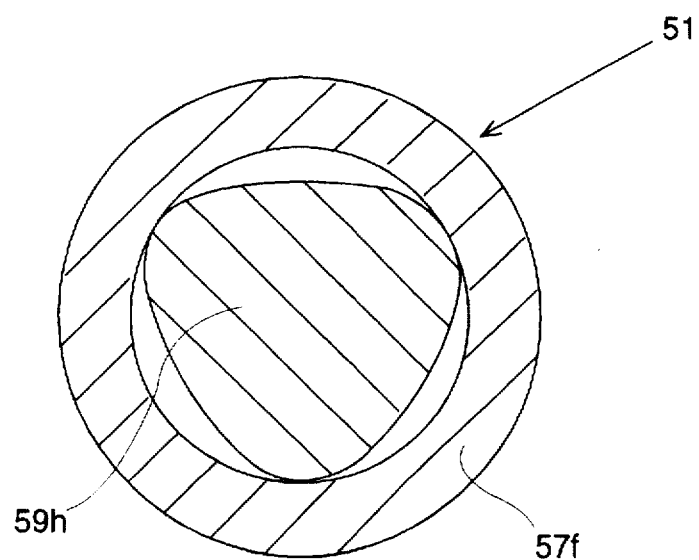
FIG. 23 is a radial sectional view of a conventional multiarc-type dynamic-pressure gas bearing.

Seventh and eighth embodiments of the present invention shown in FIGS. 15 and 16 are different from the first embodiment of the present invention primarily in that water relief portions 11d and 11e are formed in herringbone-type dynamic-pressure gas bearings 5a and 5b, respectively, in a high-pressure region, not in a multiarc-type dynamic-pressure gas bearing.

Through employment of this structure, a water film can be prevented from being formed even when the axial air flow is very small. Thus, an effect similar to that of the first embodiment of the present invention can be obtained. (See pressure distribution diagrams of FIGS. 15 and 16.)

As is apparent from the above description, the present invention provides the following effects.

(1) In a dynamic-pressure gas bearing wherein a rotational shaft is disposed to surround the outer circumference of a stationary shaft or to be surrounded by the inner circumference of the stationary shaft, and a dynamic pressure is generated between the stationary shaft and the rotational shaft through rotation of the rotational shaft, a water relief portion is provided. Thus, even when the bearing is used in a high-humidity environment or even when water (water vapor) contained in a gas liquefies due to rotation of the rotational shaft, no water film is formed between the stationary shaft and the rotational shaft to thereby prevent deterioration in bearing performance and bearing breakage which would otherwise result due to an increase in a shear force, resulting in an elongated service life of the bearing.

(2) A water relief portion in the form of an axially continuous groove provides an effect similar to that of (1) described above, and is easy to machine.

(3) When a water relief portion is composed of a plurality of depressions formed in the same circumferential surface such that a certain depression overlaps with another depression in the axial direction (overlap portion), an effect similar to that of (1) described above can be obtained.

(4) When a water relief portion is formed on a stationary shaft or a rotational shaft in a high-pressure region where no grooves are formed, even a conventional herringbone-type dynamic-pressure gas bearing becomes usable in a high-humidity environment, and an effect similar to that of (1) described above can be obtained.

Although several embodiments of the present invention have been described herein, it should be apparent to those skilled in the art that the present invention may be embodied in many other specific forms without departing from the spirit or scope of the invention.

Therefore, the present examples and embodiments are to be considered as illustrative and not restrictive and the invention is not limited to the details given herein, but may be modified within the scope and equivalence of the appended claims.

What is claimed is:

1. A dynamic-pressure gas bearing including a rotational shaft disposed to surround an outer circumference of a stationary shaft or to be surrounded by an inner circumference of a stationary shaft, to thereby generate a dynamic pressure between the stationary shaft and the rotational shaft through rotation of the rotational shaft, wherein a water relief portion is provided on the rotational shaft or the stationary shaft, which is disposed to surround the outer circumference of the stationary shaft or the rotational shaft, in a region where the surface of the stationary shaft and the surface of the rotational shaft are close to each other.

2. The dynamic-pressure gas bearing according to claim 1, wherein the water relief portion is an axially continuous groove.

3. The dynamic-pressure gas bearing according to claim 1, wherein the water relief portion comprises a plurality of depressions formed in a circumferential surface of one of the rotational shaft and the stationary shaft such that a certain depression overlaps with another depression in the axial direction.

4. A dynamic-pressure gas bearing including a rotational shaft disposed to surround an outer circumference of a stationary shaft or to be surrounded by an inner circumference of a stationary shaft, to thereby generate a dynamic pressure between the stationary shaft and the rotational shaft through rotation of the rotational shaft, wherein a water relief portion is provided on the stationary shaft or the rotational shaft in a circumferential pressure-varying region.

5. The dynamic-pressure gas bearing according to claim 4, wherein the water relief portion is an axially continuous groove.

6. The dynamic-pressure gas bearing according to claim 5, wherein the groove of the water relief portion is in a spiral shape.

7. The dynamic-pressure gas bearing according to claim 4, wherein the water relief portion comprises a plurality of depressions formed in a circumferential surface of one of the rotational shaft and the stationary shaft such that a certain depression overlaps with another depression in the axial direction.

8. A dynamic-pressure gas bearing including a rotational shaft disposed to surround an outer circumference of a stationary shaft or to be surrounded by an inner circumference of a stationary shaft, to thereby generate a dynamic pressure between the stationary shaft and the rotational shaft through rotation of the rotational shaft, wherein a water relief portion is provided on the stationary shaft or the rotational shaft at an ungrooved high-pressure region.

9. The dynamic-pressure gas bearing according to claim 8, wherein the water relief portion is an axially continuous groove.

10. The dynamic-pressure gas bearing according to claim 9, wherein the groove of the water relief portion is in a spiral shape.

11. The dynamic-pressure gas bearing according to claim 8, wherein the water relief portion comprises a plurality of depressions formed in a circumferential surface of one of the rotational shaft and the stationary shaft such that a certain depression overlaps with another depression in the axial direction.

12. A dynamic-pressure gas bearing including a rotational shaft disposed to surround an outer circumference of a stationary shaft or to be surrounded by an inner circumference of a stationary shaft, to thereby generate a dynamic pressure between the stationary shaft and the rotational shaft through rotation of the rotational shaft, wherein a water relief portion is provided and comprises a groove formed in a spiral shape.

13. The dynamic-pressure bearing according to claim 12, wherein said groove comprises an axially continuous groove.

14. The dynamic-pressure bearing according to claim 13, wherein said groove is formed in one of the rotational shaft and the stationary shaft.

15. The dynamic-pressure bearing according to claim 12, wherein said water relief portion further comprises an additional groove formed in a spiral shape, said additional groove being non-continuous with said groove.

16. The dynamic-pressure bearing according to claim 15, wherein said groove and said additional groove are formed in one of the rotational shaft and the stationary shaft.

17. The dynamic-pressure bearing according to claim 12, wherein said groove extends along only a portion of an axial length of one of the rotational shaft and the stationary shaft.

18. A dynamic-pressure gas bearing including a rotational shaft disposed to surround an outer circumference of a stationary shaft or to be surrounded by an inner circumference of a stationary shaft, to thereby generate a dynamic pressure between the stationary shaft and the rotational shaft through rotation of the rotational shaft, wherein a water relief portion is provided and comprises a plurality of depressions formed in a circumferential surface of one of the rotational shaft and the stationary shaft such that a certain depression overlaps with another depression in the axial direction.

* * * * *